(12) United States Patent
Fecant et al.

(10) Patent No.: US 7,867,473 B2
(45) Date of Patent: Jan. 11, 2011

(54) PROCESS FOR PREPARATION OF A MEL-STRUCTURAL-TYPE ZEOLITE

(75) Inventors: Antoine Fecant, Brignais (FR); Nicolas Bais, Feysin (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 470 days.

(21) Appl. No.: 12/078,716

(22) Filed: Apr. 3, 2008

(65) Prior Publication Data
US 2008/0274875 A1 Nov. 6, 2008

(30) Foreign Application Priority Data
Apr. 5, 2007 (FR) .................. 07 02489

(51) Int. Cl.
C01B 39/04 (2006.01)
(52) U.S. Cl. .................................. 423/706
(58) Field of Classification Search .............. 423/704, 423/706
See application file for complete search history.

(56) References Cited

U.S. PATENT DOCUMENTS

| 3,709,979 A | | 1/1973 | Chu | |
|---|---|---|---|---|
| 4,414,189 A | * | 11/1983 | Kokotailo et al. | 423/715 |
| 5,645,812 A | * | 7/1997 | Nakagawa | 423/706 |
| 5,968,474 A | * | 10/1999 | Nakagawa et al. | 423/706 |
| 6,022,519 A | * | 2/2000 | Shimizu et al. | 423/700 |
| 6,027,707 A | * | 2/2000 | Casci et al. | 423/705 |
| 6,444,191 B1 | * | 9/2002 | Nakagawa | 423/706 |
| 6,616,911 B2 | * | 9/2003 | Elomari | 423/706 |

FOREIGN PATENT DOCUMENTS
WO    WO 2004/013042 A    2/2004

OTHER PUBLICATIONS

Lok et al, "The role of organic molecules in molecular sieve synthesis", vol. 3, pp. 282-291, (Oct. 1983).*
Preliminary Search Report completed Oct. 19, 2007 in French application 0702489.

* cited by examiner

*Primary Examiner*—David M Brunsman
(74) *Attorney, Agent, or Firm*—Millen, White, Zelano & Branigan, P.C.

(57) ABSTRACT

A process for preparation of a MEL-structural-type zeolite that comprises at least the following stages:
i) the mixture, in aqueous medium, of at least one source of at least one tetravalent element and at least one nitrogen-containing organic radical of the formula:

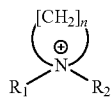

in which n represents the methylene group number ($CH_2$) and is equal to 6 or 7, and R1 and R2 represent alkyl groups that have 2 to 7 carbon atoms,
ii) the hydrothermal treatment of said mixture until said MEL-structural-type zeolite is formed, is described.

20 Claims, No Drawings

PROCESS FOR PREPARATION OF A MEL-STRUCTURAL-TYPE ZEOLITE

TECHNICAL DOMAIN

This invention relates to a new process for preparation of a MEL-structural-type zeolite that is produced in the presence of a nitrogen-containing organic structurant radical that comprises a heterocyclic compound that contains a quaternary ammonium group. Said MEL-structural-type zeolite that is obtained according to the process for the invention advantageously finds its application as catalyst, adsorbent or separating agent.

PRIOR ART

The crystallized microporous materials, such as the zeolites or the silicoaluminophosphates, are solids that are widely used in the petroleum industry as catalyst, catalyst substrate, adsorbent or separating agent. Although numerous microporous crystalline structures have been discovered, the industry of refining and petrochemistry is always seeking new zeolitic structures that have particular properties for applications such as the purification or the separation of gases, the conversion of carbon-containing radicals, or the like.

The MEL-structural-type zeolites are described in the prior art (Ch. Baerlocher, W. M. Meier, D. H. Olson, *Atlas of Zeolite Framework Types*, 5$^{th}$ Edition, 2001). The MEL-structural-type zeolites in particular comprise the ZMS-11 zeolite, Boralite D, SSZ-46, silicalite 2, and TS-2. Numerous methods for synthesis of these zeolites, in particular the zeolite ZSM-11, are known. For example, it is known from the patent U.S. Pat. No. 3,709,979 to synthesize the MEL-structural-type zeolite by using an organic structurant that is selected from among tetrabutylphosphonium chloride, benzyltriphenylphosphonium chloride, tetrabutylammonium bromide and other quaternary cations of group 5-A.

Other structurants have also already been described in the prior art for the preparation of MEL-structural-type zeolites, in particular for the preparation of the zeolite ZSM-11. Among these structurants, alkylenediamines are found that have a central chain of 7 to 12 carbon atoms (U.S. Pat. No. 4,108,881), octylamine (U.S. Pat. No. 4,894,212), diquaternary ammoniums (U.S. Pat. No. 4,941,963), 1,8-diaminooctane and 1,9-diaminononane (P. A. Jacobs and J. A. Martens, *Studies in Surface Science and Catalysis*, 33, pp. 147-166 (1987)), a cation that has $H_{2n+1}C_nN^+(CH_3)_3$ for a formula where n can be equal to 9, 10, 11 or 12 (U.S. Pat. No. 5,213,786), 3,5-dimethyl-N,N-diethylpiperidinium or a derivative of 3,5-dimethylpiperidinium (WO 95/09812), 2,2-diethyloxyethyl trimethyl ammonium (P. M. Piccione and M. E. Davis, *Microporous and Mesoporous Materials*, 49, pp. 163-169 (2001)) and the cation N-butyl-N-cyclohexylpyrrolidinium (G. Sastre et al., *Journal of Physical Chemistry B*, 107, pp. 5432-5440 (2003)).

SUMMARY AND ADVANTAGE OF THE INVENTION

This invention has as its object a process for preparation of a MEL-structural-type zeolite that comprises at least the following stages:

i) the mixture, in aqueous medium, of at least one source of at least one tetravalent element X and at least one nitrogen-containing organic radical of formula (I) that is indicated below:

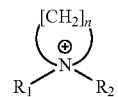

in which n represents the methylene group number ($CH_2$) and is equal to 6 or 7, and R1 and R2 represent alkyl groups that have 2 to 7 carbon atoms, ii) the hydrothermal treatment of said mixture until said MEL-structural-type zeolite is formed.

It was found that said nitrogen-containing organic structurant radical of Formula (I) that consists of an alkyl heterocyclic compound that has 6 or 7 carbon atoms and that comprises a quaternary ammonium cation, itself linked to two alkyl groups R1 and R2 that have 2 to 7 carbon atoms, mixed with at least one source of at least one tetravalent element and water, leads to the production of a high-purity MEL-structural-type zeolite. Any other crystallized or amorphous phase is generally and very preferably lacking MEL-structural-type zeolitic crystallized solid that is obtained at the end of the process of the invention. In addition, such a MEL-structural-type zeolite, prepared by the process according to the invention, is obtained with a very good crystallinity. The MEL-structural-type zeolite that is obtained by the process of the invention is obtained with excellent selectivity for widely varied gel compositions.

DESCRIPTION OF THE INVENTION

This invention has as its object a process for preparation of a MEL-structural-type zeolite that comprises at least the following stages:

i) the mixture, in aqueous medium, of at least one source of at least one tetravalent element X and at least one nitrogen-containing organic radical of formula (I) indicated below:

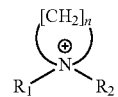

in which n represents the methylene group number ($CH_2$) and is equal to 6 or 7, and R1 and R2 represent alkyl groups that have 2 to 7 carbon atoms, ii) the hydrothermal treatment of said mixture until said MEL-structural-type zeolite is formed.

According to the invention, said nitrogen-containing organic radical of formula (I) plays the role of structurant of the MEL-structural-type zeolite that is prepared according to the process of the invention. It consists of an alkyl heterocyclic compound that comprises a quaternary ammonium cation, itself linked to two alkyl groups R1 and R2 that have 2 to 7 carbon atoms. Said alkyl groups come in the form $C_aH_{2a+1}$, where a is between 2 and 7. They can be identical or different, preferably identical. They can also be linear or branched, preferably linear. Advantageously, said nitrogen-containing organic radical of formula (I) is a cationic radical in which n is equal to 6: this is the cationic radical N,N-dialkylhexamethylene iminium. Very advantageously, said cationic radical of formula (I) is selected from among the N,N -dipropylhexamethylene iminium cation (n=6, and R1=R2=$C_3H_7$) and the N,N -dibutylhexamethylene iminium cation (n=6, and R1=R2=$C_4H_9$).

Said nitrogen-containing organic radical of formula (I) that is used for the implementation of said stage (i) of the process of the invention is synthesized by any method that is known to one skilled in the art. Concerning the synthesis of an N,N-dialkylhexamethylene iminum cation, one mol of hexamethylene imine, at least 2 mol of 1-haloalkane, and at least 1 mol of $CO_3^{2-}$ anion are mixed. More particularly, for the synthesis of the N,N-dipropylhexamethylene iminium cation, one mol of hexamethylene imine, at least 2 mol of 1-halopropane, and at least 1 mol of $CO_3^{2-}$ anion are mixed. For the synthesis of the N,N-dibutylhexamethylene iminium cation, one mol of hexamethylene imine, at least 2 mol of 1-halobutane and at least 1 mol of $CO_3^{2-}$ anion are mixed. Generally, the mixture that is formed by at least hexamethylene imine, 1-haloalkane and $CO_3^{2-}$ anion is caused to reflux for a period of between 5 and 15 hours. After filtration, precipitation by means of an ethereal solvent such as diethyl ether, then recrystallization in an ethanol/ether mixture, said nitrogen-containing organic radical of formula (I) is obtained in the pure state.

The anion that is combined with the quaternary ammonium cation that is present in the structurant organic radical for the synthesis of the MEL-structural-type zeolite is selected from among the acetate anion, the sulfate anion, the carboxylate anion, the tetrafluoroborate anion, the halide anions such as fluoride, chloride, bromide, iodide, the hydroxide anion or a combination of several among them. Preferably, the anion that is combined with the quaternary ammonium cation that is present in the structurant radical for the MEL-structural-type zeolite is the hydroxide anion or the bromide anion. The N,N-dialkylhexamethylene iminium hydroxide is preferably obtained by treatment at ambient temperature of an aqueous solution of N,N-dialkylhexamethylene iminium bromide by silver oxide.

According to the invention, at least one source of at least one tetravalent element X is incorporated in the stage (i) of the process for preparation. X is preferably selected from among silicon, germanium, titanium and the mixture of at least two of these tetravalent elements, and very preferably X is silicon. The source or sources of said tetravalent element(s) X can be any compound that comprises the element X and that can release this element into aqueous solution in reactive form. The element X can be incorporated in the mixture in an oxidized form $XO_2$ or in any other form. When X is titanium, $Ti(EtO)_4$ is advantageously used as a titanium source. When X is germanium, amorphous $GeO_2$ is advantageously used as a germanium source. In the preferred case where X is silicon, the silicon source can be any of said sources now used for the synthesis of zeolites, for example silica in powder form, silicic acid, colloidal silica, dissolved silica or tetraethoxysilane (TEOS). Among the silicas in powder form, it is possible to use the precipitated silicas, in particular those that are obtained by precipitation from an alkaline metal silicate solution, pyrogenated silicas, for example, the "CAB-O-SIL," and silica gels. It is possible to use colloidal silicas that have various particle sizes, for example with a mean equivalent diameter of between 10 and 15 nm or between 40 and 50 nm, such as those marketed under the filed trademarks such as "LUDOX." Preferably, the silicon source is LUDOX.

According to a first preferred embodiment of the process of the invention, at least one source of least one trivalent element Y is incorporated in the mixture for the implementation for said stage (i) of the process for preparation according to the invention. Said trivalent element Y is preferably selected from among aluminum, boron, iron, indium, gallium or the mixture of at least two of these trivalent elements, and very preferably, Y is aluminum. The source(s) of said trivalent element(s) Y can be any compound comprising the element Y and able to release this element into aqueous solution in reactive form. The element Y can be incorporated in the mixture in an oxidized form $YO_b$, with $1 \leq b \leq 3$ (whereby b is a whole number or a rational number) or in any other form. In the preferred case where Y is aluminum, the aluminum source is preferably sodium aluminate or an aluminum salt, for example chloride, nitrate, hydroxide or sulfate, an aluminum alkoxyde or alumina itself, preferably in hydrated or hydratable form, such as, for example, the colloidal alumina, pseudoboehmite, gamma-alumina or alpha trihydrate or beta trihydrate. It is also possible to use mixtures of the sources cited above.

According to a second preferred embodiment of the process of the invention, at least one alkaline metal and/or alkaline-earth metal M is incorporated in the mixture for the implementation of said stage (i) of the process for preparation according to the invention and is selected from among lithium, potassium, sodium, magnesium, calcium and the mixture of at least two of these metals. Preferably, said metal M is an alkaline metal, and very preferably it is sodium.

According to a third preferred embodiment of the process of the invention, the fluoride anion $F^-$ is incorporated in the mixture for the implementation of said stage (i) of the process for preparation according to the invention. As a fluoride anion source, a fluoride salt such as $NH_4F$, NaF, KF, LiF, and the mixture of at least two of these salts or hydrofluoric acid HF are used. Preferably, the fluoride anion source is the hydrofluoric acid HF in aqueous solution.

The preferred embodiments of the process of the invention described above can be carried out simultaneously or independently of one another. In particular, it is advantageous that said stage (i) of the process of the invention is implemented in the presence of a source of a trivalent element, preferably aluminum, and an alkaline metal and/or alkaline-earth metal, preferably sodium. It is also advantageous that said stage (i) of the process of the invention is implemented in the presence of a source of a fluoride anion.

According to the process for preparation according to the invention, the reaction mixture that is obtained in stage (i) has a molar composition that is expressed by the formula:

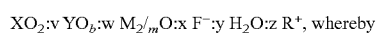
$XO_2 : v\ YO_b : w\ M_{2/m}O : x\ F^- : y\ H_2O : z\ R^+$, whereby v is between 0 and 0.5, preferably between 0.005 and 0.3
w is between 0 and 1, preferably between 0.05 and 0.5
x is between 0 and 1, preferably between 0.1 and 0.8,
y is between 1 and 100, preferably between 10 and 70
z is between 0.04 and 2, preferably between 0.06 and 1, and very preferably between 0.1 and 0.8,
b is between 1 and 3 (whereby b is a whole number or rational number)
m is equal to 1 or 2, where X, Y and M have the same definition as above, namely X is one or more tetravalent element(s) selected in the group that is formed by the following elements: silicon, germanium, titanium, very preferably X is silicon, where Y is one or more trivalent element(s) selected from the group that is formed by the following elements: aluminum, iron, boron, indium and gallium, very preferably Y is aluminum and where M is one or more alkaline metal(s) and/or alkaline-earth metal(s) selected from among lithium, sodium, potassium, calcium, magnesium and the mixture of at least two of these metals, very preferably M is sodium, $R^+$ is the nitrogen-containing, cationic organic radical of formula (I), and v, w, x, y and z respectively represent the number of mols of $YO_b$, $M_{2/m}O$, $F^-$, $H_2O$ and $R^+$.

The stage (i) of the process according to the invention consists in preparing an aqueous reaction mixture that is called a gel and that contains at least one source of at least one tetravalent element X, preferably an oxide $XO_2$, optionally at least one source of at least one trivalent element Y, preferably an oxide $YO_b$, at least one organic radical of formula (I) that consists of an alkyl heterocyclic compound that comprises a quaternary ammonium cation, optionally at least one source of one or more alkaline metal(s) and/or alkaline-earth metal(s) and optionally at least one fluoride anion source. The amounts of said reagents are adjusted so as to impart to this gel a composition that allows its crystallization into a MEL-structural-type zeolite.

It may be advantageous to add nuclei to the reaction mixture during said stage (i) of the process of the invention so as to reduce the time that is necessary to the formation of MEL-structural-type zeolite crystals and/or the total crystallization period. Said nuclei also promote the formation of said MEL-structural-type zeolite at the expense of impurities. Such nuclei comprise crystallized solids, in particular MEL-structural-type zeolite crystals. The crystalline nuclei are generally added in a ratio of between 0.01 and 10% of the weight of the source of the element X, preferably of the oxide $XO_2$, used in the reaction mixture.

According to the stage (ii) of the process according to the invention, the gel is subjected to a hydrothermal treatment, preferably carried out at a temperature of between 80° C. and 200° C., until said MEL-structural-type zeolite is formed. Under hydrothermal conditions, the gel is advantageously put under autogenous reaction pressure, optionally by adding gas, for example nitrogen, at a temperature of between 80° C. and 200° C., preferably between 140° C. and 180° C., until MEL-structural-type zeolite crystals are formed. The period that is necessary to obtain the crystallization generally varies between 1 and 50 days, preferably between 1 and 21 days, and more preferably between 3 and 14 days. The reaction is generally carried out while being stirred or without stirring, preferably with stirring.

At the end of the reaction, when said MEL-structural-type zeolite is formed following the implementation of said stage (ii) of the process for preparation of the invention, the solid phase that is formed from the MEL-structural-type zeolite is filtered, washed, and then dried. The drying is generally carried out at a temperature of between 20 and 150° C., preferably between 70 and 120° C., for a period of between 5 and 20 hours. The MEL-structural -type zeolite, dried, is generally analyzed by X-ray diffraction, whereby this technique also makes it possible to determine the purity of said zeolite that is obtained by the process of the invention. Very advantageously, the process of the invention leads to the formation of a pure MEL-structural-type zeolite in the absence of any other crystallized or amorphous phase. Said zeolite, after the drying stage, is then ready for subsequent stages such as the calcination and the ion exchange. For these stages, all the conventional methods that are known to one skilled in the art can be used.

The calcination of the MEL-structural-type zeolite that is obtained according to the process of the invention is preferably carried out at a temperature of between 500 and 700° C. and for a period of between 5 and 15 hours. The MEL-structural-type zeolite that is obtained at the end of the calcination stage is lacking in any organic radical and in particular the nitrogen-containing organic radical of formula (I).

As a general rule, the cation(s) M of the MEL-structural-type zeolite that is obtained by the process of the invention can be replaced by any one or more cation(s) of metals and in particular those of groups IA, IB, IIA, IIB, IIIA, IIIB (including the rare earths), VIII (including the noble metals) as well as by lead, tin and bismuth. The exchange is carried out by means of any water-soluble salts that contain the appropriate cation.

It is also advantageous to obtain the hydrogen form of the MEL-structural-type zeolite that is obtained according to the process of the invention. Said hydrogen form can be obtained by carrying out an ion exchange with an acid, in particular a strong mineral acid such as hydrochloric acid, sulfuric acid or nitric acid, or with a compound such as chloride, sulfate or ammonium nitrate. The ion exchange can be carried out by suspending said MEL-structural-type zeolite one or more times with the ion exchange solution. Said zeolite can be calcined before or after the ion exchange, or between two ion exchange stages. The zeolite is preferably calcined before the ion exchange, so as to eliminate any organic substance that is included in the pores of the zeolite, to the extent that the ion exchange is facilitated.

The zeolite that is obtained by the process of the invention can be used after ionic exchange as an acidic solid for the catalysis in the fields of refining and petrochemistry. It can also be used as an adsorbent for the monitoring of pollution or as a molecular sieve for the separation.

For example, when it is used as a catalyst, the zeolite that is prepared according to the process of the invention is calcined, exchanged, and is preferably in hydrogen form, and can be combined with an inorganic matrix, which can be inert or catalytically active, and a metallic phase. The inorganic matrix can be present simply as a binder to keep together the small particles of the zeolite in the different known forms of catalysts (extrudates, pellets, balls, powders) or else can be added as a diluent for imposing the degree of conversion in a process that would otherwise proceed at too quick a rate, leading to fouling of the catalyst due to significant coke formation. Typical inorganic matrices are in particular substrate materials for the catalysts, such as silica, the different forms of alumina, magnesia, zirconia, the oxides of titanium, boron and zirconium, the phosphates of aluminum and titanium, kaolinic clays, bentonites, montmorillonites, sepiolite, attapulgite, fuller's earth, synthetic porous materials such as $SiO_2$—$Al_2O_3$, $SiO_2$—$ZrO_2$, $SiO_2$—$ThO_2$, $SiO_2$—$BeO$, $SiO_2$—$TiO_2$, or any combination of these compounds. The inorganic matrix can be a mixture of various compounds, in particular an inert phase and an active phase.

The zeolite that is prepared according to the process of the invention can also be combined with at least one other zeolite and can play the role of primary active phase or additive.

The metallic phase is introduced on the zeolite alone, the inorganic matrix alone, or the inorganic matrix-zeolite unit by ion exchange or impregnation with cations or oxides that are selected from among the following elements: Cu, Ag, Ga, Mg, Ca, Sr, Zn, Cd, B, Al, Sn, Pb, V, P, Sb, Cr, Mo, W, Mn, Re, Fe, Co, Ni, Pt, Pd, Ru, Rh, Os, Ir and any other element from the periodic table.

The metals can be introduced either all in the same way or by different techniques, at any time of the preparation, before or after shaping and in any order. In addition, intermediate treatments such as, for example, a calcination and/or a reduction can be applied between the deposits of different metals.

The catalytic compositions that comprise the MEL-structural-type zeolite that is prepared according to the process of the invention are suitable in a general way for the implementation of the primary processes for transformation of hydrocarbons and synthesis reactions of organic compounds such as ethers.

Any shaping method that is known to one skilled in the art is suitable for the catalyst that comprises the MEL-structural-type zeolite. It will be possible to use, for example, the pelletizing or the extrusion of the shaping of balls. The shaping of the catalyst that contains the zeolite that is prepared according to the process of the invention and that comes at least partially in acidic form is generally such that the catalyst is preferably in the form of extrudates or balls for the purpose of its use.

The invention is illustrated by the following examples that do not in any way exhibit a limiting nature.

EXAMPLE 1

Preparation of N,N-Dibutylhexamethylene Iminium Bromide (Structurant A1)

50 g of hexamethylene imine (0.50 mol, 99%, Aldrich) is added in a 1 L flask that contains 200 ml of ethanol, 105 g of potassium carbonate (0.76 mol, 99%, Aldrich) and 173 g of 1-bromobutane (1.26 mol, 99%, Aldrich). The reaction medium is stirred and caused to reflux for 8 hours. The mixture is then cooled to ambient temperature and then filtered. The filtrate is poured into 300 ml of diethyl ether, and then the precipitate that is formed is filtered and washed with 100 ml of diethyl ether. The solid that is obtained is recrystallized in an ethanol/ether mixture. The solid that is obtained is dried under vacuum for 12 hours. 82 g of a white solid (or a yield of 56%) is obtained.

The product has the expected $^1$H NMR spectrum. $^1$H NMR (CDCl$_3$, ppm/TMS): 0.98 (6H, t); 1.44 (4H, sext); 1.69 (4H, m); 1.76 (4H, m); 2.00 (4H, m); 3.43 (4H, t); 3.66 (4H, t).

EXAMPLE 2

Preparation of N,N-Dibutylhexamethylene Iminium Hydroxide (Structurant A2)

29 g of Ag$_2$O (0.125 mol, 99%, Aldrich) is added in a 250 ml Teflon beaker that contains 30 g of structurant A1 (0.10 mol) and 100 ml of deionized water. The reaction medium is stirred in the absence of light for 12 hours. The mixture is then filtered. The filtrate that is obtained consists of an aqueous solution of N,N-dibutylhexamethylene iminium hydroxide. The metering of this radical is carried out by NMR of the proton using formic acid as a standard.

EXAMPLE 3

Preparation of a Silicic Mel-Structural-Type Zeolite According to the Invention 21.27 g of a colloidal suspension of silica, known under the trade name © Ludox AS-40 marketed by Aldrich, is incorporated in a solution that consists of 23.19 g of an aqueous solution with 23.33% by mass of structurant A2 and 54.54 g of deionized water. The molar composition of the mixture is as follows: SiO$_2$; 0.17 A2; 33.33H$_2$O. The mixture is stirred vigorously for half an hour. The mixture is then transferred, after homogenization, into a 150 ml stainless steel autoclave. The autoclave is heated for 7 days at 170° C. while being stirred (500 rpm). The crystallized product that is obtained is filtered, washed with deionized water (to reach a neutral pH), and then dried for one night at 100° C.

The dried solid product has been analyzed by X-ray diffraction: the crystallized solid obtained is a pure MEL-structural-type zeolite.

EXAMPLE 4

Preparation of an Aluminosilicic Mel-Structural-Type Zeolite According to the Invention 21.27 g of a colloidal suspension of silica, known under the trade name © Ludox AS-40 marketed by Aldrich, is incorporated in a solution that consists of 23.19 g of an aqueous solution with 23.33% by mass of structurant A2, 0.09 g of aluminum hydroxide (Aldrich) and 54.48 g of deionized water. The molar composition of the mixture is as follows: SiO$_2$; 0.0042 Al$_2$O$_3$; 0.17 A2; 33.33H$_2$O. The mixture is stirred vigorously for half an hour. The mixture is then transferred, after homogenization, into a 150 ml stainless steel autoclave. The autoclave is heated for 7 days at 170° C. while being stirred (500 rpm). The crystallized product that is obtained is filtered, washed with deionized water (to reach a neutral pH), and then dried for one night at 100° C.

The dried solid product has been analyzed by x-ray diffraction: the crystallized solid obtained is a pure MEL-structural-type zeolite.

EXAMPLE 5

Preparation of an Aluminosilicic Mel-Structural-Type Zeolite According to the Invention 20.61 g of a colloidal suspension of silica, known under the trade name © Ludox AS-40 marketed by Aldrich, is incorporated in a solution that consists of 0.85 g of sodium aluminate (Carlo Erba), 1.62 g of soda (Prolabo), and 6.68 g of structurant A1 in 69.24 g of deionized water. The molar composition of the mixture is as follows: SiO$_2$; 0.017 Al$_2$O$_3$; 0.17 Na$_2$O; 0.17 A1; 33.33 H$_2$O. The mixture is stirred vigorously for half an hour. The mixture is then transferred, after homogenization, into a 150 ml stainless steel autoclave. The autoclave is heated for 7 days at 170° C. while being stirred (500 rpm). The crystallized product that is obtained is filtered, washed with deionized water (to reach a neutral pH), and then dried for one night at 100° C.

The dried solid product has been analyzed by X-ray diffraction: the crystallized solid that is obtained is a pure MEL-structural-type zeolite.

EXAMPLE 6

Preparation of a Germanosilicic Mel-Structural-Type Zeolite According to the Invention 9.99 g of a colloidal suspension of silica, known under the trade name © Ludox AS -40 marketed by Aldrich, is incorporated in a solution that consists of 2.97 g of amorphous germanium oxide (Aldrich), 27.99 g of an aqueous solution with 23.33% by mass of structurant A2, and 58.08 g of deionized water. The molar composition of the mixture is as follows: 0.7 SiO$_2$; 0.3 GeO$_2$; 0.3 A2; 50 H$_2$O. The mixture is stirred vigorously for half an hour. The mixture is then transferred, after homogenization, into a 150 ml stainless steel autoclave. The autoclave is heated for 7 days at 170° C. while being stirred (500 rpm). The crystallized product that is obtained is filtered, washed with deionized water (to reach a neutral pH), and then dried for one night at 100° C.

The dried solid product has been analyzed by X-ray diffraction: the crystallized solid that is obtained is a pure MEL-structural-type zeolite.

EXAMPLE 7

Preparation of a Germanosilicic Mel-Structural-Type Zeolite According to the Invention 12.27 g of a colloidal suspension of silica, known under the trade name © Ludox AS-40 marketed by Aldrich, is incorporated in a solution that consists of 0.96 g of amorphous germanium oxide (Aldrich), 44.61 g of an aqueous solution with 23.33% by mass of structurant A2, 2.28 g of an aqueous solution with 39.5% by mass of HF, and 38.88 g of deionized water. The molar composition of the mixture is as follows: 0.9 $SiO_2$; 0.1 $GeO_2$; 0.5 A2; 0.5 HF; 50 $H_2O$. The mixture is stirred vigorously for half an hour. The mixture is then transferred, after homogenization, into a 150 ml stainless steel autoclave. The autoclave is heated for 14 days at 170° C. while being stirred (500 rpm). The crystallized product that is obtained is filtered, washed with deionized water (to reach a neutral pH), and then dried for one night at 100° C.

The dried solid product has been analyzed by X-ray diffraction: the crystallized solid obtained is a pure MEL-structural-type zeolite.

EXAMPLE 8

Preparation of N,N-Dipropylhexamethylene Iminium Bromide (Structurant B1)

50 g of hexamethylene imine (0.50 mol, 99%, Aldrich) is added in a 1 L flask that contains 200 ml of ethanol, 105 g of potassium carbonate (0.76 mol, 99%, Aldrich) and 155 g of 1-bromopropane (1.26 mol, 99%, Aldrich). The reaction medium is stirred and caused to reflux for 8 hours. The mixture is then cooled to ambient temperature and then filtered. The filtrate is poured into 300 ml of diethyl ether, then the precipitate that is formed is filtered and washed with 100 ml of diethyl ether. The solid that is obtained is recrystallized in an ethanol/ether mixture. The solid that is obtained is dried under vacuum for 12 hours. 93.72 g of a white solid (or a yield of 71%) is obtained.

The product has the expected $^1$H NMR spectrum. $^1$H NMR ($CDCl_3$, ppm/TMS): 1.00 (6H, t); 1.71 (4H, m); 1.74 (4H, sext); 1.96 (4H, m); 3.36 (4H, t); 3.62 (4H, t).

EXAMPLE 9

Preparation of N,N-Dipropylhexamethylene Iminium Hydroxide (Structurant B2)

32 g of $Ag_2O$ (0.14 mol, 99%, Aldrich) is added in a 250 ml Teflon beaker that contains 30 g of structurant B1 (0.11 mol) and 100 ml of deionized water. The reaction medium is stirred in the absence of light for 12 hours. The mixture is then filtered. The filtrate that is obtained consists of an aqueous solution of N,N-dipropylhexamethylene iminium hydroxide. The metering of this radical is carried out by NMR of the proton using formic acid as a standard.

EXAMPLE 10

Preparation of a Silicic Mel-Structural-Type Zeolite According to the Invention 21.42 g of a silica suspension, known under the trade name © Ludox AS-40 marketed by Aldrich, is incorporated in a solution that consists of 18.87 g of an aqueous solution with 25.35% by mass of structurant B2 and 58.71 g of deionized water. The molar composition of the mixture is as follows: $SiO_2$; 0.17 B2; 33.33$H_2O$. The mixture is stirred vigorously for half an hour. The mixture is then transferred, after homogenization, into a 150 ml stainless steel autoclave. The autoclave is heated for 14 days at 170° C. while being stirred (500 rpm). The crystallized product that is obtained is filtered, washed with deionized water (to reach a neutral pH), and then dried for one night at 100° C.

The dried solid product has been analyzed by X-ray diffraction: the crystallized solid that is obtained is a pure MEL-structural-type zeolite.

EXAMPLE 11

Preparation of an Aluminosilicic Mel-Structural-Type Zeolite According to the Invention 20.79 g of a silica suspension, known under the trade name © Ludox AS-40 marketed by Aldrich, is incorporated in a solution that consists of 0.21 g of sodium aluminate (Carlo Erba), 1.79 g of soda (Prolabo), and 6.09 g of structurant B1 in 70.07 g of deionized water. The molar composition of the mixture is as follows: $SiO_2$; 0.004 $Al_2O_3$; 0.17 $Na_2O$; 0.17 B1; 33.33 $H_2O$. The mixture is stirred vigorously for half an hour. The mixture is then transferred, after homogenization, into a 150 ml stainless steel autoclave. The autoclave is heated for 5 days at 170° C. while being stirred (500 rpm). The crystallized product that is obtained is filtered, washed with deionized water (to reach a neutral pH), and then dried for one night at 100° C.

The dried solid product has been analyzed by X-ray diffraction: the crystallized solid that is obtained is a pure MEL-structural-type zeolite.

EXAMPLE 12

Preparation of a Germanosilicic Mel-Structural-Type Zeolite According to the Invention 9.6 g of a colloidal suspension of silica, known under the trade name © Ludox AS -40 marketed by Aldrich, is incorporated in a solution that consists of 2.88 g of amorphous germanium oxide (Aldrich), 40.23 g of an aqueous solution with 22.82% by mass of structurant B2, 2.28 g of an aqueous solution of HF at 39.5% weight/weight, and 44.04 g of deionized water. The molar composition of the mixture is as follows: 0.7 $SiO_2$; 0.3 $GeO_2$; 0.5 B2; 0.5 HF; 50 $H_2O$. The mixture is stirred vigorously for half an hour. The mixture is then transferred, after homogenization, into a 150 ml stainless steel autoclave. The autoclave is heated for 6 hours at 170° C. while being stirred (500 rpm). The crystallized product that is obtained is filtered, washed with deionized water (to reach a neutral pH), and then dried for one night at 100° C.

The dried solid product has been analyzed by X-ray diffraction: the crystallized solid that is obtained is a pure MEL-structural-type zeolite.

EXAMPLE 13

Preparation of a Catalyst that Comprises a Mel-Structural-Type Zeolite Synthesized in the Si/Al System The zeolite that is used in this example is the crude synthesis MEL-structural-type zeolite that is obtained in the Si/Al system of Example 4. This zeolite has an overall Si/Al atomic ratio of 135.

This MEL-structural-type zeolite first undergoes a so-called dry calcination at 550° C. under a stream of air for 8 hours so as to eliminate the nitrogen-containing organic structurant radical A2. The solid that is obtained is then put into extrudate form by mixing with boehmite (Pural SB3, Sasol) in a Z-arm mixing machine and extrusion of the paste that is obtained with a piston extruder. The extrudates are then dried at 120° C. for 12 hours in air and calcined at 550° C. for 2 hours under a stream of air in a muffle furnace. They constitute the substrate of the catalyst.

Platinum is deposited on the alumina of this substrate by anion exchange with hexachloroplatinic acid in the presence of a competing agent (hydrochloric acid). The exchanged substrate is then dried at 120° C. for 12 hours in air and calcined at 550° C. under a stream of dry air for 1 hour.

The thus prepared catalyst consists of content by weight of 50% of MEL-structural-type zeolite in hydrogen form, 49.8% of alumina, and 0.2% of platinum.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application Ser. No. 07/02.489, filed Apr. 5, 2007 is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for preparation of a MEL-structural-type zeolite that comprises at least the following stages:
   i) providing a mixture comprising, in aqueous medium at least one source of at least one tetravalent element X and at least one nitrogen-containing organic radical of formula (I)

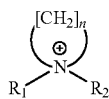

(I)

wherein n represents 6 or 7 methylene groups (CH$_2$) and R1 and R2 represent alkyl groups C$_a$H$_{2a+1}$, wherein a is between 2 and 7 inclusive,
   ii) subjecting said mixture to hydrothermal treatment under sufficient conditions to form said MEL-structural-type zeolite.

2. A process for preparation according to claim 1, wherein said nitrogen-containing organic radical of formula (I) is an N,N-dipropylhexamethylene iminium cation or an N,N-dibutylhexamethylene iminium cation.

3. A process for preparation according to claim 1 wherein the tetravalent element X is silicon, germanium, titanium or a mixture of at least two of said tetravalent elements.

4. A process for preparation according to claim 3, wherein said tetravalent element X is silicon.

5. A process for preparation according to claim 1, wherein at least one source of at least one trivalent element Y is incorporated in the mixture of said stage i).

6. A process for preparation according to claim 5, wherein said element Y is aluminum.

7. A process for preparation according to claim 5, wherein at least one alkaline metal and/or alkaline-earth metal M is incorporated in the mixture of said stage i).

8. A process for preparation according to claim 7, wherein fluoride anion is incorporated in the mixture for the implementation of said stage i).

9. A process for preparation according to claim 8, wherein said hydrothermal treatment according to said stage ii) is carried out at a temperature of between 80° C. and 200° C.

10. A process for preparation according to claim 5, wherein fluoride anion is incorporated in the mixture for the implementation of said stage i).

11. A process for preparation according to claim 1, wherein at least one alkaline metal and/or alkaline-earth metal M is incorporated in the mixture of said stage i).

12. A process for preparation according to claim 11, wherein said metal M is sodium.

13. A process for preparation according to claim 1, wherein fluoride anion is incorporated in the mixture of said stage i).

14. A process for preparation according to claim 1, wherein the mixture in stage (i) has a molar composition expressed by the formula XO$_2$:vYO$_b$:wM$_{2/m}$O:xF$^-$:y H$_2$O:zR$^+$, in which v is between 0 and 0.5 inclusive, w is between 0 and 1 inclusive, x is between 0 and 1 inclusive, y is between 1 and 100 inclusive, z is between 0.04 and 2 inclusive, b is between 1 and 3 inclusive (wherein b is a whole number or a rational number), and m is equal to 1 or 2, and wherein R$^+$ is a nitrogen-containing, cationic organic radical of formula (I), wherein Y is at least one trivalent element, M is at least one alkaline metal and/or alkaline-earth metal and, R$^+$ is at least one nitrogen-containing organic radical of formula (I), and wherein v, w, x, y and z respectively represent the number of mols of YO$_b$, M$_{2/m}$O, F$^-$, H$^2$O and R$^+$.

15. A process for preparation according to claim 14, wherein said hydrothermal treatment according to said stage ii) is carried out at a temperature of between 80° C. and 200° C.

16. A process according to claim 14, wherein
   v is between 0.005 and 0.3 inclusive
   w is between 0.05 and 0.5 inclusive
   x is between 0.1 and 0.8 inclusive
   y is between 1.0 and 70 inclusive
   z is between 0.1 and 0.8 inclusive
   b is between 1 and 3 inclusive
   m is 1 or 2.

17. A process for preparation according to claim 1, further comprising forming a reaction mixture according to said stage i).

18. A process according to claim 17, further comprising adding nuclei of a MEL-structural type zeolite to the reaction mixture.

19. A process for preparation according to claim 1, wherein said hydrothermal treatment according to said stage ii) is carried out at a temperature of between 80° C. and 200° C.

20. A process for preparation according to claim 1, wherein a solid phase is formed by the MEL-structural-type zeolite, obtained at the end of said stage ii), which is then filtered, washed, and dried.

* * * * *